US009471894B2

(12) United States Patent
Palamarchuk et al.

(10) Patent No.: US 9,471,894 B2
(45) Date of Patent: *Oct. 18, 2016

(54) FIDUCIAL MARKERS WITH A SMALL SET OF VALUES

(71) Applicant: Amazon Technologies, Inc., Seattle, WA (US)

(72) Inventors: Andriy Palamarchuk, Winchester, MA (US); Jeremiah David Brazeau, Hudson, NH (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,505

(22) Filed: Aug. 31, 2015

(65) Prior Publication Data

US 2015/0371181 A1    Dec. 24, 2015

Related U.S. Application Data

(63) Continuation of application No. 14/298,789, filed on Jun. 6, 2014, now Pat. No. 9,152,149.

(51) Int. Cl.
*G06Q 10/08* (2012.01)
*G05D 1/02* (2006.01)
*G01C 21/20* (2006.01)

(52) U.S. Cl.
CPC .......... *G06Q 10/087* (2013.01); *G01C 21/206* (2013.01); *G05D 1/0234* (2013.01); *G05D 1/0246* (2013.01); *G05D 2201/0216* (2013.01)

(58) Field of Classification Search
CPC ......... G06Q 10/08; G05D 1/02; G01C 21/20
See application file for complete search history.

(56) References Cited

U.S. PATENT DOCUMENTS 4,819,169 A * 4/1989 Saitoh .................. G06T 7/0042
180/168
4,940,925 A * 7/1990 Wand ................... G05D 1/0212
318/580

(Continued)

FOREIGN PATENT DOCUMENTS

EP    2407845    1/2012

OTHER PUBLICATIONS

U.S. Appl. No. 14/298,756, filed Jun. 6, 2015, Titled: Robotic Communication With Fiber Optics.

(Continued)

*Primary Examiner* — Thomas Tarcza
*Assistant Examiner* — Alex C Dunn
(74) *Attorney, Agent, or Firm* — Kilpatrick Townsend & Stockton LLP

(57) ABSTRACT

A system for managing inventory items includes a portable inventory holder and an unmanned drive unit configured to move the inventory holder between locations in an inventory facility. The inventory facility includes a plurality of uniquely identifiable fiducial markers having a small set of values distributed in a pattern. The drive unit captures at least one image of a subset of the plurality of the fiducial markers. The at least one captured image is processed to determine a location of the drive unit within the facility. A path is determined along which the drive unit moves to an inventory holder and moves the inventory holder to another location. The pattern of fiducial markers can include one or more repeated instances of uniquely identifiable fiducial markers. A fiducial marker can encode information using a readable code and at least one attribute of the fiducial marker.

20 Claims, 16 Drawing Sheets

(56) References Cited

U.S. PATENT DOCUMENTS

| | | | | |
|---|---|---|---|---|
| 5,111,401 | A * | 5/1992 | Everett, Jr. | G05D 1/0242 180/169 |
| 5,189,612 | A * | 2/1993 | Lemercier | G05D 1/0238 180/168 |
| 7,421,338 | B2 | 9/2008 | Kim et al. | |
| 7,826,919 | B2 * | 11/2010 | D'Andrea | B66F 9/063 700/214 |
| 8,214,081 | B2 | 7/2012 | Choi et al. | |
| 8,280,547 | B2 * | 10/2012 | D'Andrea | B66F 9/063 700/214 |
| 8,918,202 | B2 * | 12/2014 | Kawano | G05D 1/0234 700/213 |
| 9,152,149 | B1 | 10/2015 | Palamarchuk et al. | |
| 2004/0010337 | A1 | 1/2004 | Mountz et al. | |
| 2004/0202351 | A1 | 10/2004 | Park et al. | |
| 2006/0129276 | A1 | 6/2006 | Watabe et al. | |
| 2007/0150097 | A1 | 6/2007 | Chae et al. | |
| 2007/0288123 | A1 * | 12/2007 | D'Andrea | B66F 9/063 700/214 |
| 2008/0001372 | A1 * | 1/2008 | Hoffman | G06Q 10/087 280/35 |
| 2010/0214784 | A1 | 8/2010 | Stauffer et al. | |
| 2012/0143427 | A1 | 6/2012 | Hoffman et al. | |
| 2012/0146066 | A1 | 6/2012 | Tischler et al. | |
| 2013/0166108 | A1 * | 6/2013 | Sturm | G05D 1/021 701/2 |
| 2013/0184849 | A1 * | 7/2013 | Chan | G06Q 10/08 700/113 |
| 2014/0058556 | A1 * | 2/2014 | Kawano | G05D 1/0234 700/216 |

OTHER PUBLICATIONS

U.S. Appl. No. 14/298,789, "Non-Final Office Action", Mar. 5, 2015, 7 pages.

U.S. Appl. No. 14/298,789, "Notice of Allowance", Jun. 16, 2015, 5 pages.

PCT/US2015/034734, "International Search Report and Written Opinion", mailed Aug. 11, 2015, 10 pages.

* cited by examiner

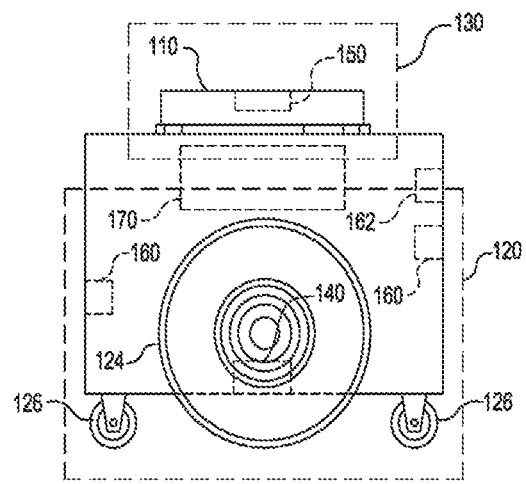
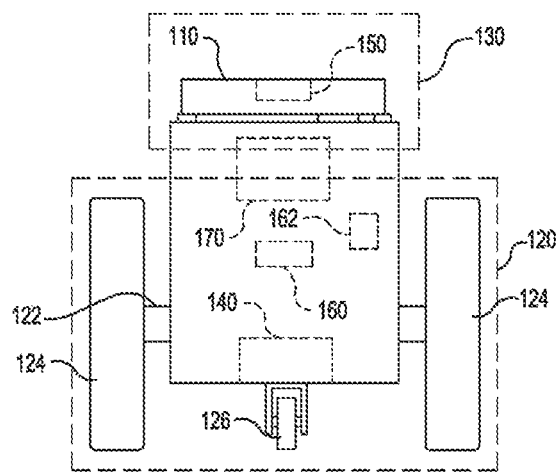

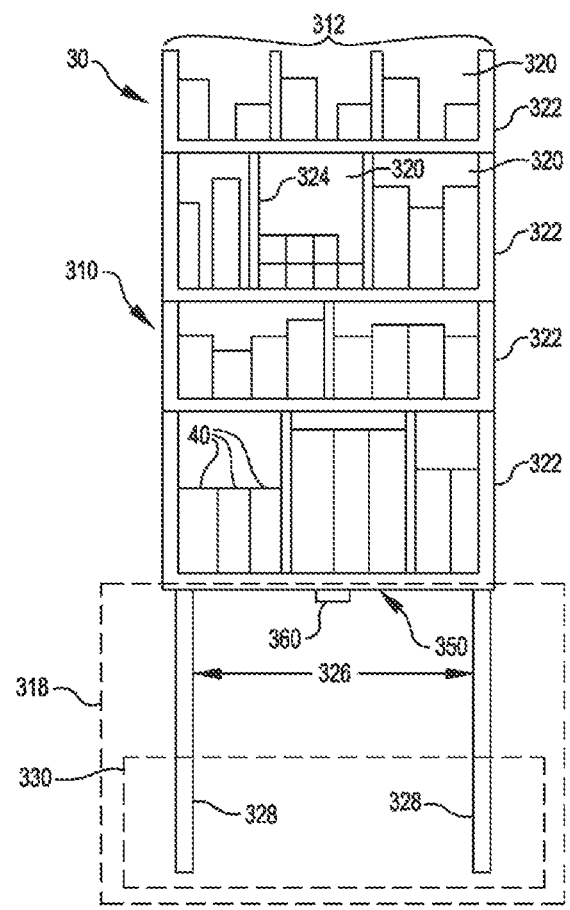

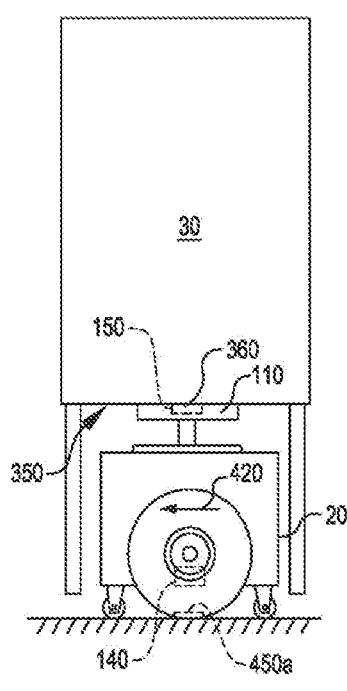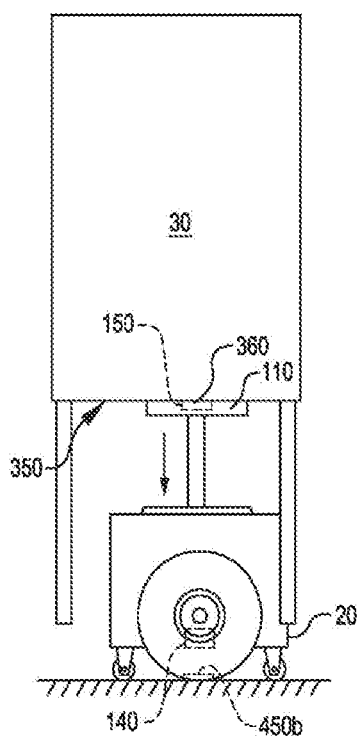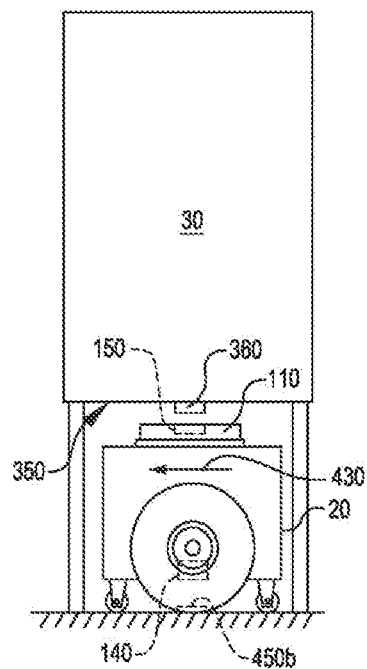

FIDUCIAL MARKER ORIENTATION RELATIVE TO
A REFERENCE DIRECTION

FIDUCIAL MARKER COLOR

FIDUCIAL MARKER SIZE

FIDUCIAL MARKER SHAPE

*FIG. 13*

FIDUCIAL MARKERS WITH A SMALL SET OF VALUES

CROSS-REFERENCE TO RELATED APPLICATIONS

This application is a continuation of U.S. patent application Ser. No. 14/298,789, filed Jun. 6, 2014 and entitled "FIDUCIAL MARKERS WITH A SMALL SET OF VALUES", the entirety of which is incorporated by reference herein.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure are described with reference to the drawings.

FIGS. 3A and 3B illustrate an example mobile drive unit that may be utilized in particular embodiments of the inventory system shown in FIG. 1.

FIG. 4 illustrates an example inventory holder that may be utilized in particular embodiments of the inventory system shown in FIG. 1.

FIGS. 5A-5F show operation of various components of the mobile drive unit and the inventory holder during docking, movement and undocking.

FIG. 13 illustrates example attributes of fiducial markers that can be used in the inventory facility of FIG. 10.

DETAILED DESCRIPTION

Figure 1:
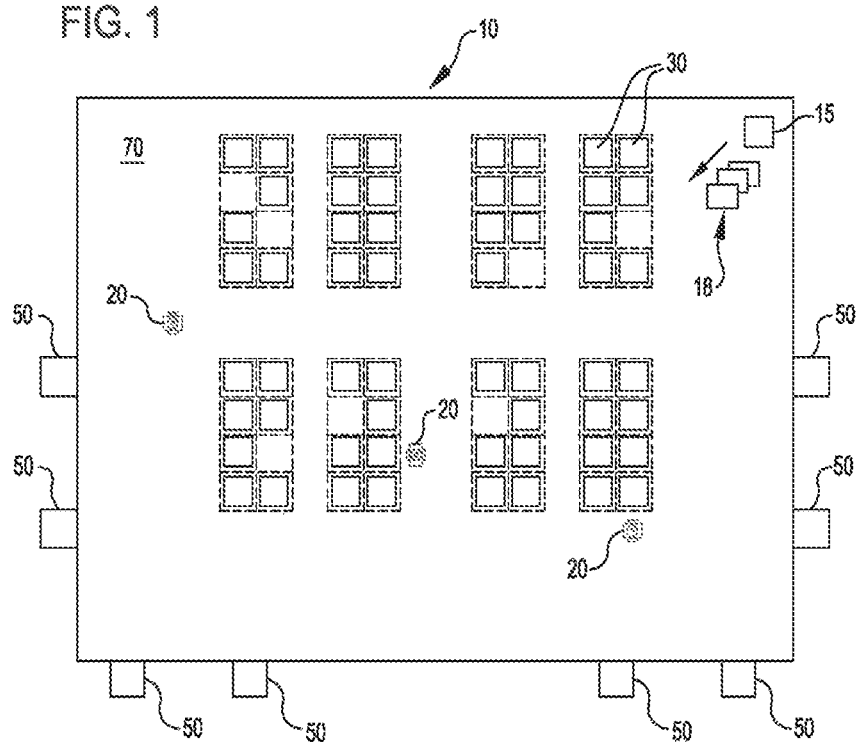
FIG. 1 illustrates components of an inventory system according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS," the entire disclosures of which are herein incorporated by reference.

Specifically, in one aspect, features herein are directed to navigation of unmanned drive units used to move inventory holders in an inventory system. To this end, an inventory facility may employ light emitting elements, for example optical fibers that conduct light from one or more light sources and emit the conducted light at defined physical locations distributed within the inventory facility. An unmanned drive unit captures an image of one or more of the light emitting elements as the drive unit moves within the inventory facility. The captured image is processed to determine the location of the drive unit within the inventory facility. The determined location is then used in planning and controlling movement of the drive unit, including moving the drive unit to an inventory holder and using the drive unit to move the inventory holder to a desired location.

The one or more light sources can be used to transmit a unique light signal(s) to one or more of the drive units. To this end, in one embodiment, one or more light sources are coupled to optical fibers at respective first ends and respective second ends of each of the optical fibers are positioned at defined physical locations in an inventory facility. By emitting a unique light signal(s) as detected at the second ends of the fibers, a drive unit can identify a current location and determine or receive instructions for navigation of the drive unit within the inventory facility based on the identified current location.

The optical fibers can be embedded in a concrete floor of the inventory facility, or alternatively in a raised floor or supplemental surface disposed over an existing floor surface. Such a supplemental surface can be used to avoid replacing an existing floor surface. The embedded optical fibers can replace fiducial markers that may currently be used to determine the location of an unmanned drive unit within the inventory facility. The wavelength of light emitted from the optical fibers can be varied to communicate information and/or data to a drive unit. Additionally, the fibers can be used for bi-directional transmission of data to the drive unit and/or from the drive unit, thereby providing a means of communication with a drive unit other than, for example, a wireless network.

One example system for managing inventory items can include a portable inventory holder, an unmanned drive unit used to transport the inventory holder within the inventory facility, and a management module. The portable inventory holder is configured to store at least one inventory item at a first location in an inventory facility. The inventory facility has a floor that includes a plurality of light emitting optical fibers. The unmanned drive unit includes an image capture device (e.g., a camera) oriented substantially towards the floor surface. The management module includes computer-executable instructions configured to control the drive unit. For example, the instructions cause the unmanned drive unit to perform actions including: (a) moving the drive unit about the inventory facility, (b) capturing at least one image of one or more of the light emitting optical fibers using the image capture device, (c) processing the at least one captured image to locate the drive unit within the inventory facility, (d) determining a path to move the drive unit to the first location and then to the second location, (e) moving the drive unit along the path to the first location based at least in part on the at least one captured image, and (f) using the drive unit to move the portable inventory holder along the path from the first location to the second location based at least in part on the at least one captured image. In many embodiments, processing the captured image includes referencing a map of locations of the light emitting optical fibers. In many embodiments, the optical fibers are at least partially embedded within the floor. The optical fibers can be distributed in any suitable pattern, including regular and random patterns.

The system for transporting inventory items can include one or more light sources operatively coupled with the optical fibers to transmit light through the optical fibers for imaging by the image capture device. The one or more light sources can be configured to transmit a plurality of different wavelengths of light through one or more of the optical fibers. The one or more light sources can be configured to transmit data and/or at least one control command to the drive unit via light transmitted through one or more of the optical fibers. The data and/or at least one command transmitted to the drive unit can be encoded using any suitable communication protocol employing any suitable one or more variations in a characteristic of the transmitted light. For example, the data and/or at least one command can be transmitted to the drive unit via at least partially via changes in wavelength of light transmitted through the one or more optical fibers. Other possible variations in the transmitted light can include variations in transmission frequency, sequence, pattern, intensity or any other suitable variation in a characteristic of the transmitted light.

The drive unit can include a drive unit light source. The drive unit light source can be oriented substantially towards the floor surface. The computer-executable instructions can be further configured to direct the drive unit to perform actions including transmitting data from the drive unit over one or more of the optical fibers via light emitted by the drive unit light source. Any suitable variation in at least one characteristic of the transmitted light can be used to transmit data from the drive unit over the one or more optical fibers, including, but not limited to, a variation in frequency, sequence, pattern, intensity or any other suitable variation in a characteristic of the transmitted light.

In another aspect, features herein are directed to navigation of unmanned drive units used to move inventory holders about an inventory facility. In this aspect, the inventory facility may employ fiducial markers with a reduced set of values that are placed close enough together so that an image capture device (e.g., a camera) of an unmanned drive unit will image at least two of the fiducial markers at a time. The fiducial markers can be distributed such that the fiducial markers imaged by the image capture device will create a unique combination for each location of a drive unit in the inventory facility.

In many embodiments, fiducial value information is encoded using attributes other than code such as a bar code. For example, fiducial orientation in combination with the unmanned drive unit being configured to determine its own orientation (e.g., via the unmanned drive unit including a compass) can be used to encode information. Different marker colors, marker size, and marker shapes can also be used in encode information. Additional values can be encoded in a suitable readable code included in each of the fiducial markers, for example, in a bar code, QR code, MaxiCode, Data Matrix, EZ Code, or any other identifying tag or code.

An example system for managing inventory items includes a portable inventory holder, a plurality of fiducial markers distributed in a pattern, a management module having computer-executable instructions and a drive unit. The portable inventory holder is configured to store at least one inventory item in an inventory facility having a floor. The drive unit includes an image capture device (e.g., a camera) oriented substantially towards the floor. The plurality of fiducial markers are distributed in a pattern on the floor such that a respective plurality of the fiducial markers can be imaged by the image capture device for each of a plurality of respective locations of the drive unit on the floor. The computer-executable instructions are configured to cause the system to perform actions including: (a) moving the drive unit about the inventory facility; (b) capturing at least one image of a subset of the plurality of the fiducial markers using the image capture device; (c) processing the at least one captured image to locate the drive unit within the inventory facility, the processing including referencing a map of locations of the fiducial markers; (d) determining a path to move the drive unit to the first location and then to the second location; (e) moving the drive unit along the path to the first location based at least in part on the at least one captured image; and (f) using the drive unit to move the portable inventory holder along the path from the first location to the second location based at least in part on the at least one captured image.

In many embodiments of the system for transporting inventory items, the pattern of fiducial markers includes repeated instances of each of a plurality of uniquely identifiable fiducial markers. For example, the pattern of fiducial markers can include 100 or fewer uniquely identifiable fiducial markers. In many embodiments, the pattern of fiducial markers includes 20 or fewer uniquely identifiable fiducial markers.

In many embodiments of the system for transporting inventory items, each of the unique fiducial markers has attributes that encode respective fiducial value information. The fiducial markers can further include a suitable readable code, such as a bar code, QR code, MaxiCode, Data Matrix, EZ Code, or any other identifying tag or code. For example, fiducial markers can encode respective fiducial value information using a readable code and at least one attribute of the fiducial marker. In many embodiments, the at least one attribute includes at least one of: (a) an orientation of the fiducial marker relative to a reference direction, (b) a color of the fiducial marker, (c) a size of the fiducial marker, and (d) a shape of the fiducial marker.

In many embodiments of the system for transporting inventory items, the management module is further configured to cause the system to control operations of the drive unit based at least in part on the at least one captured image. Such operations of the drive unit can include, for example, at least one of stopping the drive unit, rotating the drive unit, redirecting the drive unit, and changing operations of the drive unit.

Turning now to the drawings in which the same reference numbers are used to refer to the same or similar elements, FIG. 1 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 1 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 2.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 3A and 3B.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g., from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 1 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 1 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 2:
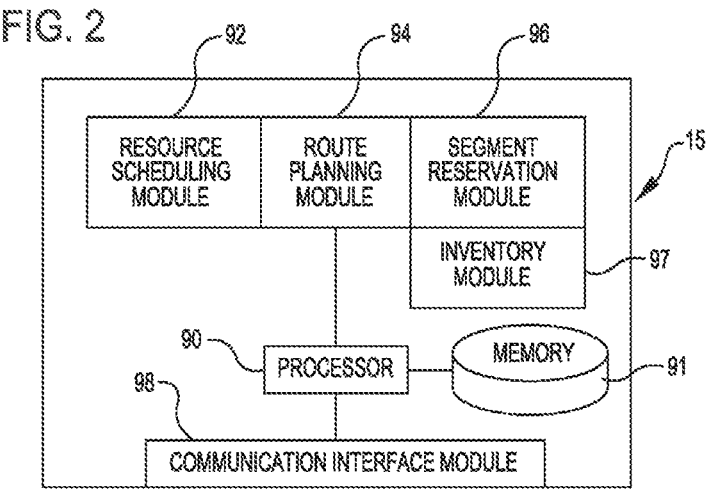
FIG. 2 illustrates in greater detail the components of an example management module that may be utilized in the inventory system shown in FIG. 1.

FIG. 2 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

FIGS. 3A and 3B illustrate in greater detail the components of a particular embodiment of mobile drive unit 20. In particular, FIGS. 3A and 3B include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel drive module 120. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speed from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 3A and 3B illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

FIG. 4 illustrates in greater detail the components of a particular embodiment of inventory holder 30. In particular, FIG. 4 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks 450. Mobile drive unit 20 may be configured to detect fiducial marks 450 and to determine the location of mobile drive unit 20 and/or measure its movement based on the detection of fiducial marks 450.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 40. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

FIGS. 5A-5H illustrate operation of particular embodiments of mobile drive unit 20 and inventory holder 30 during docking, movement, and undocking.

Figure 5A:
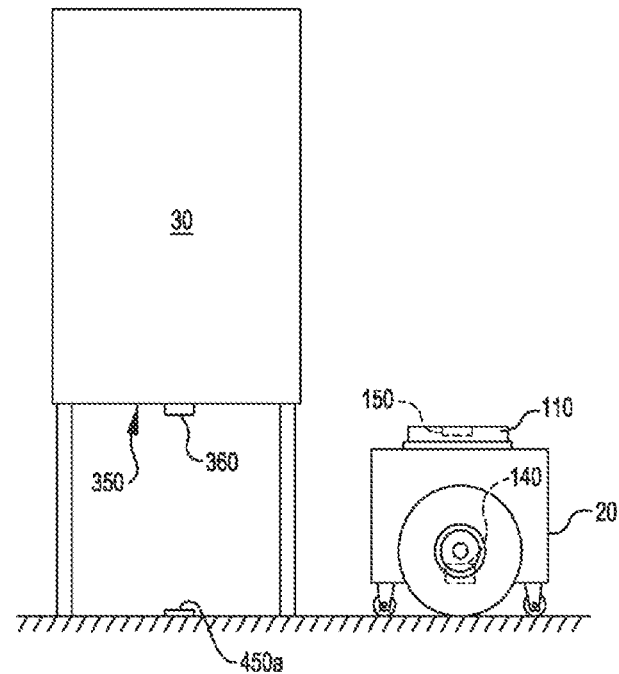

FIG. 5A illustrates mobile drive unit 20 and inventory holder 30 prior to docking. As noted above with respect to FIG. 1, mobile drive unit 20 may receive a command that identifies a location for a particular inventory holder 30. Mobile drive unit 20 may then move to the location specified in the command. Additionally, mobile drive unit 20 may utilize position sensor 140 to determine the location of mobile drive unit 20 to assist in navigating to the location of inventory holder 30.

In particular, FIG. 5A shows mobile drive unit 20 and inventory holder 30 as mobile drive unit 20 approaches the storage location identified by the received command. In the illustrated embodiment, the reference point is marked by fiducial mark 450*a* which comprises a surface operable to reflect light and which, as a result, can be detected by particular embodiments of position sensor 140 when mobile drive unit 20 is positioned over or approximately over fiducial mark 450*a*. As noted above, the illustrated embodiment of mobile drive unit 20 utilizes optical sensors, including a camera and appropriate image- and/or video processing components, to detect fiducial marks 450.

Figure 5B:
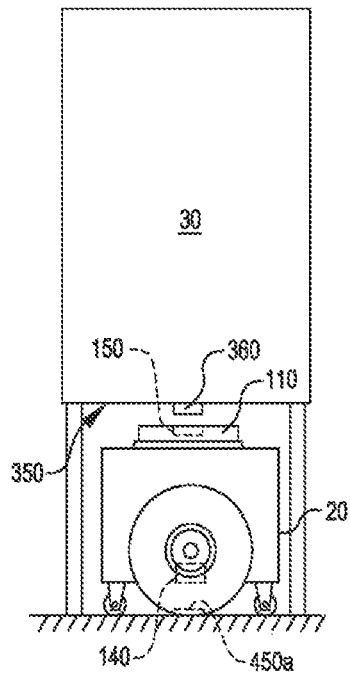

FIG. 5B illustrates mobile drive unit 20 and inventory holder 30 once mobile drive unit 20 reaches fiducial mark 450*a*. Because, in the illustrated example, fiducial mark 450*a* marks the location of the reference point to which mobile drive unit 20 is destined, mobile drive unit 20 begins the docking process once mobile drive unit 20 reaches fiducial mark 450*a*. In the illustrated example, mobile drive unit 20 is configured to dock with inventory holder 30 from a position beneath inventory holder 30 and, as a result, inventory holder 30 is stored so that docking surface 350 is located directly above fiducial mark 450*a*.

Figure 5C:
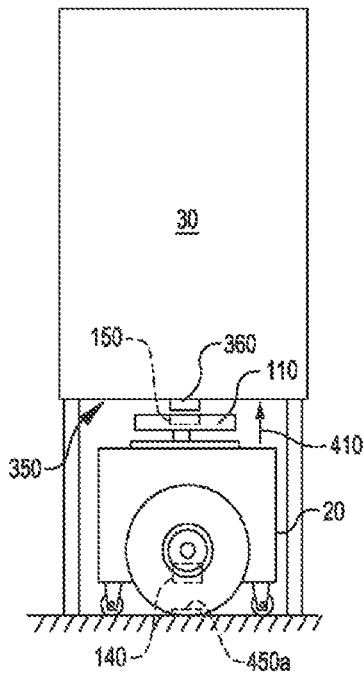

FIG. 5C illustrates operation of mobile drive unit 20 in docking with inventory holder 30. After positioning itself over fiducial mark 450*a*, mobile drive unit 20 begins the docking process. In the illustrated example, the docking process includes mobile drive unit 20 raising docking head 110 towards docking surface 350, as indicated by arrow 410. Additionally, in the illustrated example, mobile drive unit 20 and inventory holder 30 are configured so that mobile drive unit 20 lifts inventory holder 30 off the ground when mobile drive unit 20 docks with inventory holder 30 and, as a result, mobile drive unit 20 supports the weight of inventory holder 30 while mobile drive unit 20 is docked to inventory holder 30.

FIG. 5D illustrates operation of mobile drive unit 20 after docking with inventory holder 30. Mobile drive unit 20 is capable of inducing translational and/or rotational movement in inventory holder 30 while mobile drive unit 20 is docked with inventory holder 30. For example, in the illustrated embodiment, inventory holder 30 is supported by mobile drive unit 20 while the two components are docked and mobile drive unit 20 is capable of inducing translational and/or rotational movement in inventory holder 30 by moving or rotating itself or some sub-component of itself, such as docking head 110. As a result, while mobile drive unit 20 and inventory holder 30 are docked mobile drive unit 20 may move inventory holder 30 to a requested destination based on commands received by mobile drive unit 20, as suggested by arrow 420.

Once mobile drive unit 20 and inventory holder 30 arrive at the destination, mobile drive unit 20 may additionally rotate inventory holder 30 to present a particular face of inventory holder 30 to a packer or otherwise maneuver inventory holder 30 to allow access to inventory items 40 stored by inventory holder 30. Mobile drive unit 20 may then undock from inventory holder 30, as described below, or move inventory holder to another destination. For example, mobile drive unit 20 may move inventory holder 30 to a packing station where a packer can select appropriate inventory items 40 from inventory holder 30. Mobile drive unit 20 may then return inventory holder 30 to its original location or another location appropriate for undocking, such as a new storage location reserved for inventory holder 30.

FIG. 5E illustrates mobile drive unit 20 and inventory holder 30 when the two components arrive at an appropriate point for undocking. As noted above, this may represent a final destination specified by the original command, the original storage location for inventory holder 30, or any other point within the workspace. At or near the destination, mobile drive unit 20 may detect another fiducial mark 450, fiducial mark 450*b*, associated with the undocking location. Mobile drive unit 20 determines its location based on fiducial mark 450*b* and, as a result, determines that it has reached the undocking location. After determining that it has reached the undocking location, mobile drive unit 20 initiates an appropriate undocking process based on the configuration and characteristics of mobile drive unit 20 and inventory holder 30.

FIG. 5F illustrates a mobile drive unit 20 and inventory holder 30 subsequent to undocking. Mobile drive unit 20 may then move away from inventory holder 30 and begin responding to other commands received by mobile drive unit 20.

As described above, embodiments herein are directed to movement of inventory items 40 between inventory holders 30. In accordance with some embodiments, the mobile drive units 20 are utilized to perform the function of initiating and causing the movement of inventory items 40 between the adjacent inventory holders 30.

Light Emitting Element Based Navigation/Communication

Figure 6:
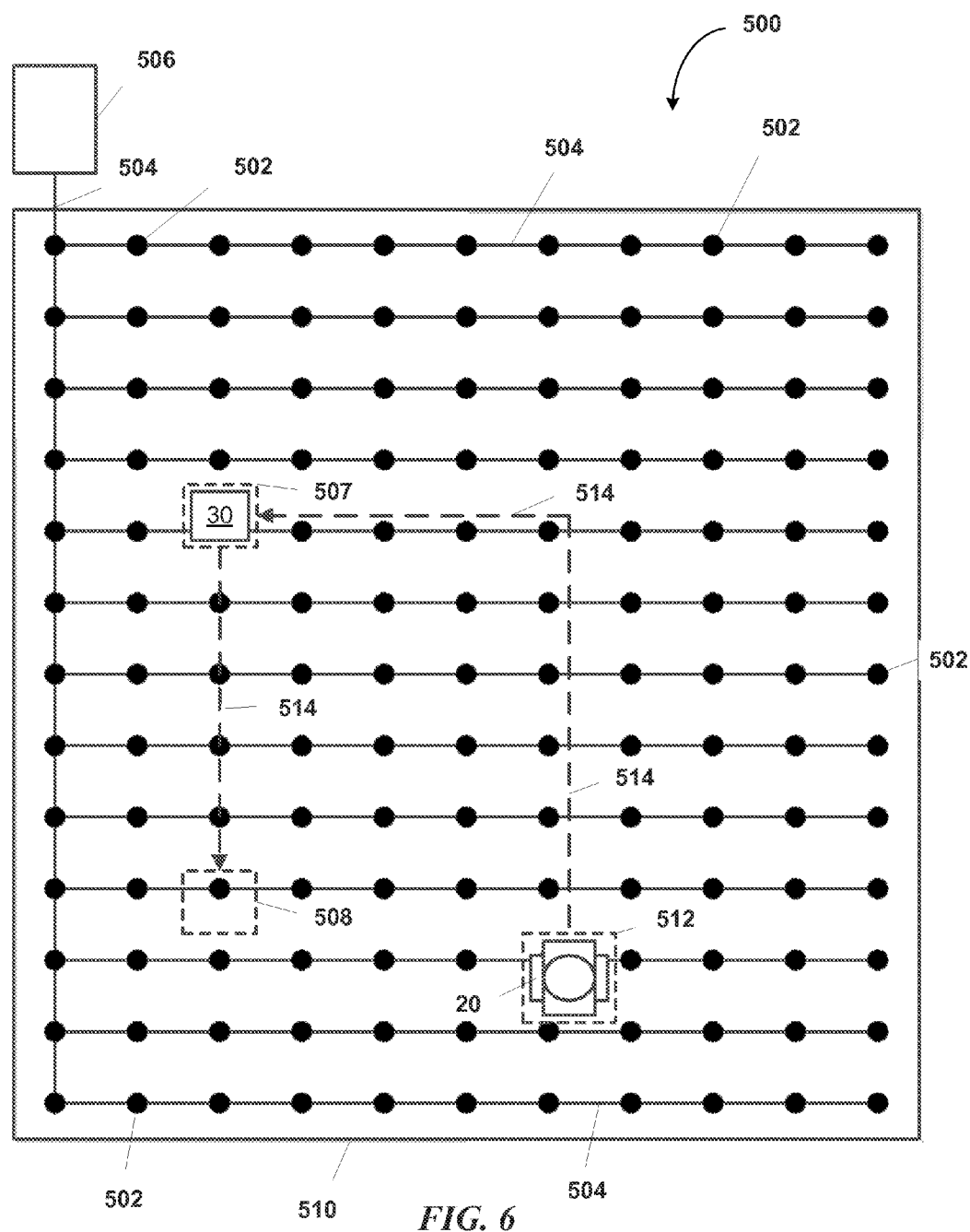
FIG. 6 illustrates an example inventory facility that includes light emitting elements and an unmanned drive unit that navigates within the facility using the light emitting elements.

FIG. 6 schematically illustrates an example inventory facility 500 that includes light emitting elements 502 distributed over the floor of the inventory facility 500. In the illustrated embodiment, the light emitting elements 502 include optical fibers 504 that are operatively coupled with one or more light sources 506. While the illustrated embodiment employs optical fibers 504, any suitable light emitting element (e.g., light emitting diodes) can be used. In many embodiments, the optical fibers 504 are embedded into a floor of the inventory facility 500. The light emitting elements 502, however, can be arranged in any suitable manner within the inventory facility 500. For example, some or all of the light emitting elements 502 can be mounted to the ceiling and/or walls of the inventory facility 500. An unmanned mobile drive unit 20 captures images of the light emitting elements 502 as the mobile drive unit 20 moves within the inventory facility 500. For example, the position sensor 140 of the mobile drive unit 20 can include an image capture device, such as a digital camera. A captured image is processed to determine the corresponding location of the mobile drive unit 20 within the inventory facility 500. The determined location is then used in planning and controlling movement of the mobile drive unit 20, including moving to an inventory holder 30 disposed at a first location 507 and moving the inventory holder to a desired second location 508.

The optical fibers 504 can be embedded in a concrete floor of the inventory facility 500. The embedded optical fibers 504 can be used to determine the location of mobile drive unit 20 within the inventory facility 500. Variations in wavelength of light emitted from the optical fibers 504 can be detected by a sensor (e.g., position sensor 140) on mobile drive unit 20 for use in determining the location of the mobile drive unit 20 within the inventory facility 500. Additionally, the optical fibers 504 can be used for the transmission of data between the mobile drive unit 20 and the management module 15 thereby providing a means of communication other than, for example, a wireless network.

Any suitable variation in a characteristic of light can be used for the transmission of data over the optical fibers 504. As non-limiting examples, the data transmitted between the management module 15 and the mobile drive unit 20, in either direction, can be encoded at least partially via at least one of different wavelengths of light, different frequencies, different sequences of light, different patterns of light, different intensities of light, and/or any other suitable variation in a characteristic of light.

The data transmitted through the optical fibers 504 between the mobile drive unit 20 and the management module 15 can include any of the information, commands, requests, responses, and/or assignments described herein. For example, the management module 15 may communicate task assignments to selected mobile drive units 20 that identify one or more locations for the selected mobile drive unit 20. The task assignment may define the location of an inventory holder to be retrieved, an inventory station 50 to be visited, a storage location where the mobile drive unit 20 should park until receiving another task, or a location associated with any other task. A drive unit 20 transmit a request over the optical fibers 504 for a path to a particular destination associated with the task. Components of the inventory system, such as one or more of the mobile drive units 20, can transmit information over the optical fibers 504 to the management module 15 regarding their current state, other components of the inventory system 10 with which they are interacting, and/or other conditions relevant to the operation of the inventory system 10. The task assignments communicated over the optical fibers 504 can, for example, prompt one or more of the mobile drive units 20 to recharge or have batteries replaced, instruct inactive mobile drive units to park in a location outside the anticipated traffic flow or a location near the anticipated site of future tasks, and/or direct mobile drive units 20 selected for repair or maintenance to move towards a designated maintenance station. The mobile drive units 20 can transmit a route request over the optical fibers 504 to the management module. After generating an appropriate path, the management module 15 can transmit a route response identifying the generated path over the optical fibers 504 to the requesting drive unit 20. The mobile drive units 20 can transmit a reservation request (requesting the use of a particular segment of the workspace 70) over the optical fibers 504 to the management module 15. In response, the management module 15 can transmit a reservation response over the optical fibers 504 to the requesting mobile drive unit 20. The reservation response can grant or deny the reservation request. More basic movement commands can also be transmitted over the optical fibers 504 from the management module 15 to one or more of the mobile drive units 20. For example, such basic commands can direct the mobile drive unit 20 to stop, move forward, move backward, rotate, dock with an inventory holder, undock from an inventory holder, and/or transmit a request for any relevant information from the mobile drive unit 20, such as location of the mobile drive unit 20.

Mobile drive unit 20 navigates within a workspace area 510 of the inventory facility 500 using the light emitting elements 502. As illustrated, the mobile drive unit 20 initially resides at a location 512 within the workspace 510. Thereafter, the mobile drive unit 20 receives a request to move a portable inventory holder 30 from the first location 507 in the workspace 510 to the second location 508. In response to receiving this request, the mobile drive unit 20 may either reference a map of the workspace 510 stored within the mobile drive unit 20, may request (or simply receive) the map from a remote entity such as the management module 15, or may request (or simply receive) an indication of one or more subsets of the light emitting elements 502 that apply to the first and second locations and/or an indication of one or more subsets of the light emitting elements 502 applicable to a path to reach these locations.

After referencing the map or otherwise determining the light emitting elements 502 corresponding to a path to the first location 507 and from the first location 507 to the second location 508, the mobile drive unit 20 and/or the management module 15 may determine a path 514 for the mobile drive unit 20 to move along. Thereafter, the mobile drive unit 20 may use its drive mechanism to begin travelling along the path 514. While moving along the path 514, the mobile drive unit 20 may periodically, continuously, or randomly capture images using its camera directed downwards towards the floor and the light emitting elements 502. The mobile drive unit 20 and/or the management module 15 may compare the light emitting elements 502 imaged by the mobile drive unit 20 with the subsets of the light emitting elements determined from the map and corresponding to the path 514 to determine whether the mobile drive unit 20 is in fact on the path 514. If not, then the mobile drive unit 20 may correct its path.

The mobile drive unit 20 and/or the management module 15 may utilize image recognition and comparison techniques to determine whether the images captured by the camera correspond to images of light emitting elements as expected as determined via the map. While the mobile drive unit 20 can perform the image comparison, in other embodiments the mobile drive unit 20 may provide the images captured by its camera to a remote entity (e.g., management module 15) for performing the comparison. In either case, after reaching the first location 507, the mobile drive unit 20 may lift the portable inventory holder 30 and move the holder 30 to the second location 508.

Furthermore, in some instances the mobile drive unit 20 may utilize the light emitting elements 502 along with additional location-determination techniques. For example, the mobile drive unit 20 may be equipped with global positioning satellite (GPS) technology, which may be used to determine a location of the drive unit 20 according to a first tolerance. The images captured by the camera of the mobile drive unit 20 may then be used to determine the location at a second, lesser tolerance. Stated otherwise, the GPS or other global positioning location technique (e.g., WiFi triangulation, etc.) may be used to locate the mobile drive unit 20 within a particular area of the workspace 510, and the map on the floor surface and light emitting elements may aid in the determination of the location of the mobile drive unit 20 more precisely.

Figure 7:
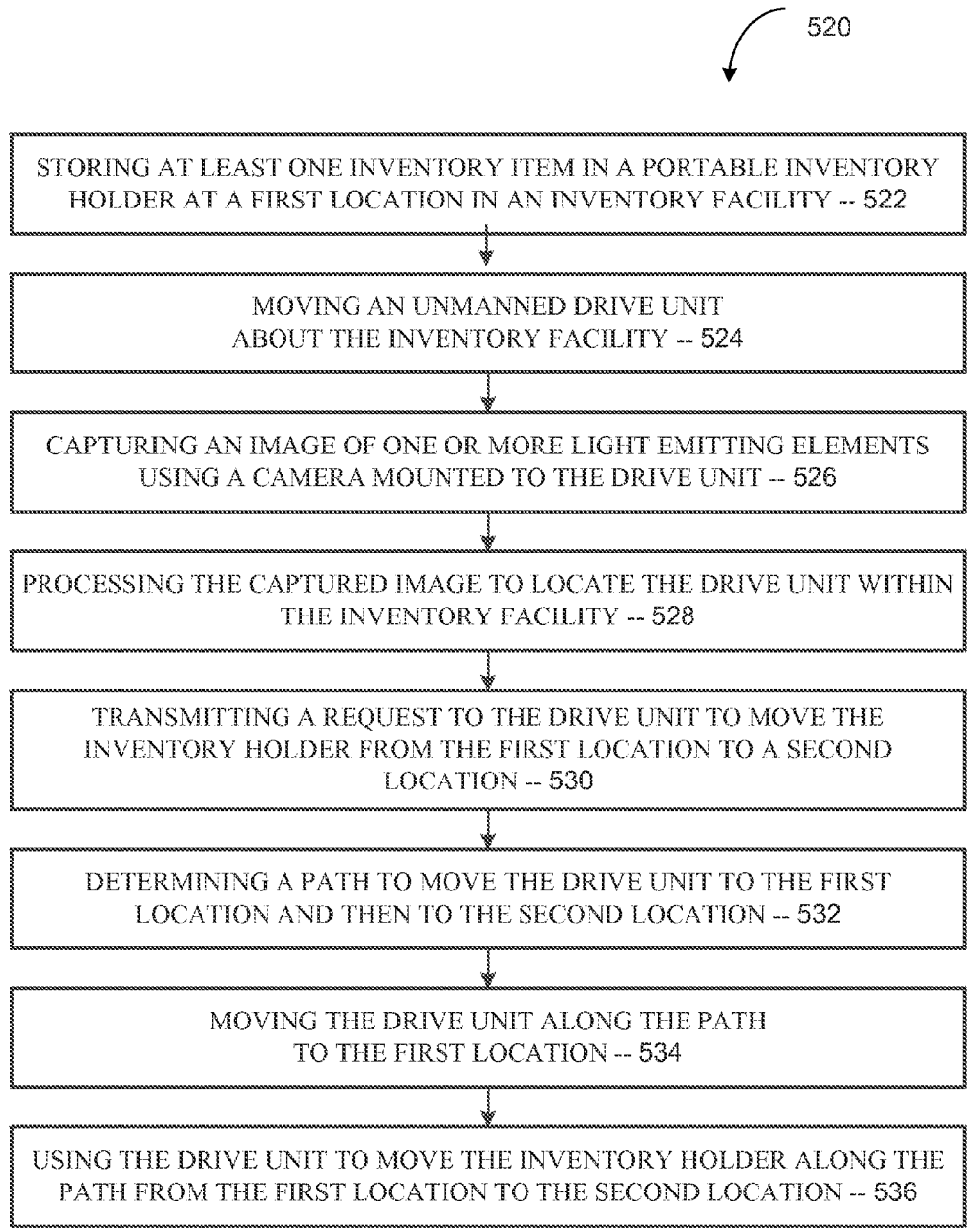
FIG. 7 illustrates acts of an example method for moving an inventory item within the inventory facility of FIG. 6.

FIG. 7 illustrates acts of a method 520 for moving an inventory item, in accordance with many embodiments. Some or all of the method 520 (or any other method described herein, or variations and/or combinations thereof) may be performed under the control of one or more computer systems configured with executable instructions and may be implemented as code (e.g., executable instructions, one or more computer programs and/or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Any suitable inventory system described herein can be used to practice the method 520.

The method 520 includes storing at least one inventory item in a portable inventory holder at a first location in an inventory facility (act 522). An unmanned drive unit is moved about the inventory facility (act 524). The unmanned drive unit captures an image of one or more light emitting elements using a camera (or other suitable device) mounted to the drive unit (act 526). The captured image is processed to locate the drive unit within the inventory facility (act 528). A request is transmitted to the drive unit to move the inventory holder from the first location to the second location (act 530). A path is determined to move the drive unit to the first location and then to the second location (act 532). The drive unit is moved along the path to the first location (act 534). The drive unit is used to move the inventory holder along the path from the first location to the second location (act 536).

Figure 8:
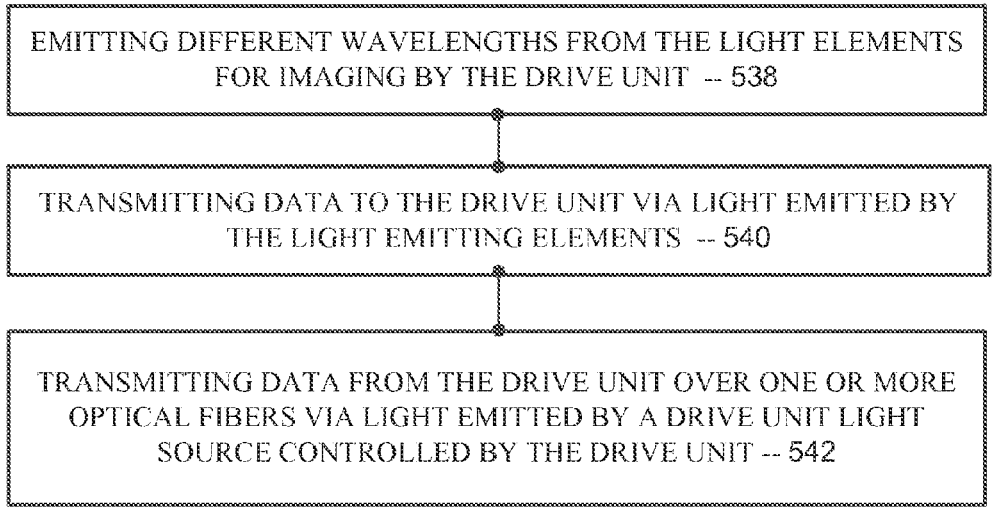
FIG. 8 illustrates additional acts that can be accomplished in the method of FIG. 7.

FIG. 8 illustrates additional acts that can be accomplished in conjunction with the method 520. For example, different wavelengths can be emitted from each of one or more of the light emitting elements (act 538). The different wavelengths can be used for any suitable purpose. For example, the different wavelengths emitted from each of one or more of the light emitting elements can be sequenced and/or timed so that a particular light emitting element imaged by the drive unit can be identified.

Data can be transmitted to the drive unit via light emitted by the light emitting elements (act 540). For example, the one or more light sources 506 can be controlled to transmit light through the optical fibers using any suitable optical communication protocol. As another example, the different wavelengths emitted from each of one or more of the light emitting elements can be sequenced and/or timed so as to communicate data and/or an instruction(s) to the drive unit. For instance, a particular wavelength (e.g., a red wavelength) can be emitted from one or more of the light emitting elements to instruct any drive unit within the respective area to stop moving.

Data can be transmitted from the drive unit over one or more of the optical fibers via light emitted by a drive unit light source controlled by the drive unit (act 542). The drive unit light source can be mounted to the drive unit. For example, the drive unit light source can be integrated with the position sensor 140. The drive unit light source can be controlled to transmit light sequences according to any suitable optical communication protocol. The transmitted light sequences can include one or more wavelengths of light. Transmitted data can be received by a suitable optical communication receiver such as, for example, an optical data receiver integrated with the one or more light sources 506. The emitted light can have different frequencies, sequences, patterns, brightness, or any other variation of characteristics of light to identify different locations or provide various directions/instructions to/from the drive units.

After the light emitting elements are placed within the inventory facility, a map can be created that associates each of the light emitting elements with its respective location within the workspace 510. As such, a mobile drive unit 20 can image one or more of the light emitting elements and the image processed to determine the location of the mobile drive unit 20 relative to the imaged light emitting elements. The map can then be used in conjunction with the determined location of the mobile drive unit 20 relative to the imaged light emitting elements to determine the location of the mobile drive unit 20 within the inventory facility. The location of the mobile drive unit 20 can be updated in any suitable fashion as the mobile drive unit 20 moves around the inventory facility. The location of the mobile drive unit 20 can be used to determine a path to move the mobile drive unit 20 to the location of a portable inventory holder 30 and along which the mobile drive unit 20 can move the portable inventory holder to a desired location, such as to a selected inventory station 50.

The map that associates each of the light emitting elements with its respective location within the workspace 510 can be created in a number of ways. For example, a person can use a camera to create a plan view image of the workspace 510. The plan view image can be processed using software to correlate each of the light emitting elements with a respective location within the workspace 510. As another example, one or more of the mobile drive units 20 can navigate about the workspace 510 while capturing images of the floor surface and noting the location at which the images have been captured. The mobile drive units 20 can then either create the map by correlating the different light emitting elements with corresponding locations within the workspace 510, or can provide the captured images and location information to a remote entity (e.g., management module 15) for creation of the map by the remote entity. The mobile drive unit(s) 20 can communicate with the remote entity using any suitable communication means, such as over a wired and/or wireless network(s). In some instances; the remote entity may be located within the inventory facility, while in other instances the remote entity may be located outside of the facility.

Figure 9:
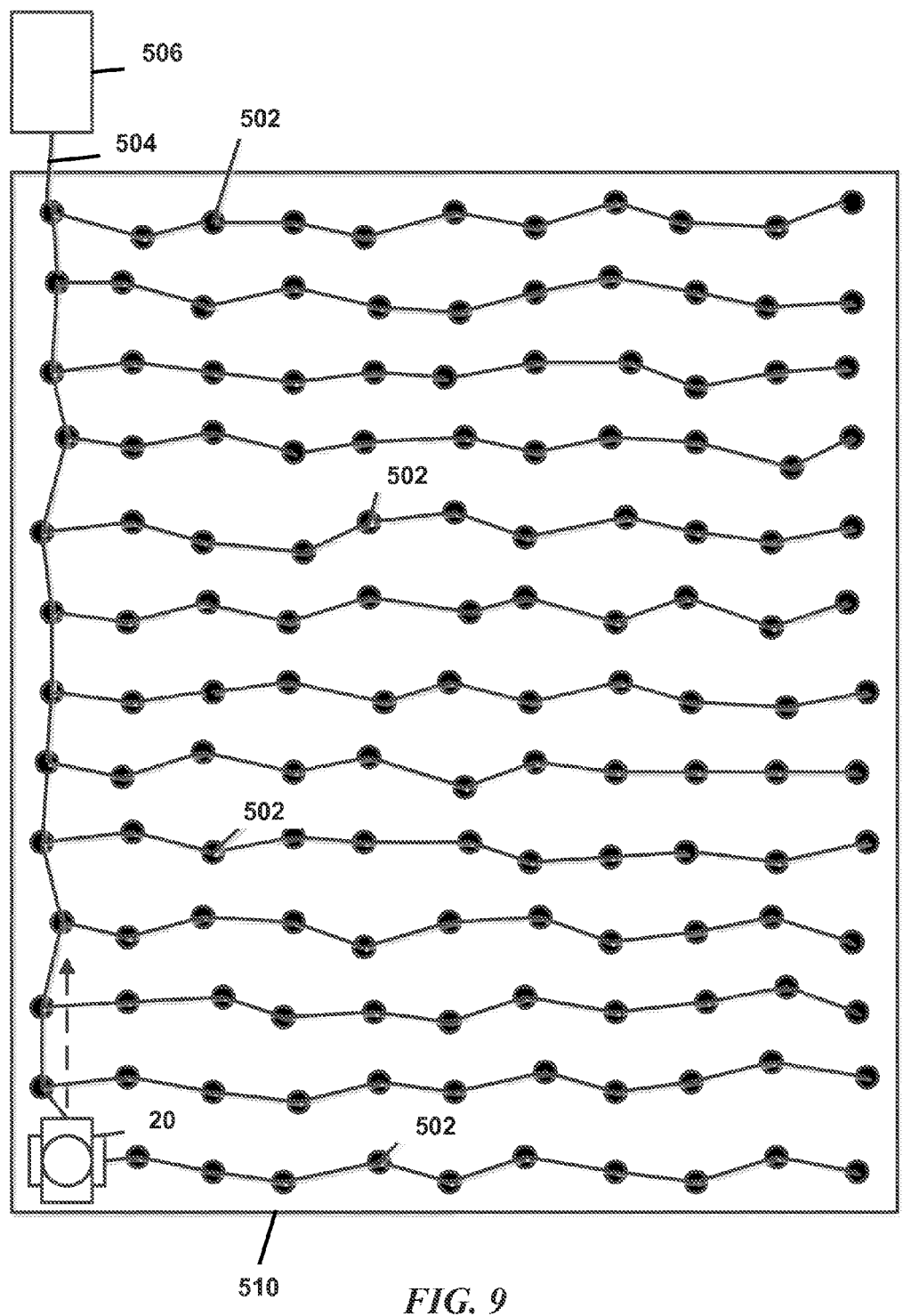
FIG. 9 illustrates an example of an unmanned drive unit navigating about the facility of FIG. 6 to capture images of the light emitting elements and either creating a map of the facility that includes the locations of the light emitting elements or uploading the images to a remote entity to create the map.

FIG. 9 illustrates an example approach for creation of such a reference map. Here, an unmanned mobile drive unit 20 navigates about the facility of FIG. 6 to capture images of the light emitting elements 502. In some instances, multiple drive units 20 can capture images, either by traveling in pre-specified paths or random paths. Utilizing multiple mobile drive units 20 to capture images for creating the map may result in a level of redundancy that increases the accuracy of the resulting map.

Fiducial Markers with a Small Set of Values

Figure 10:
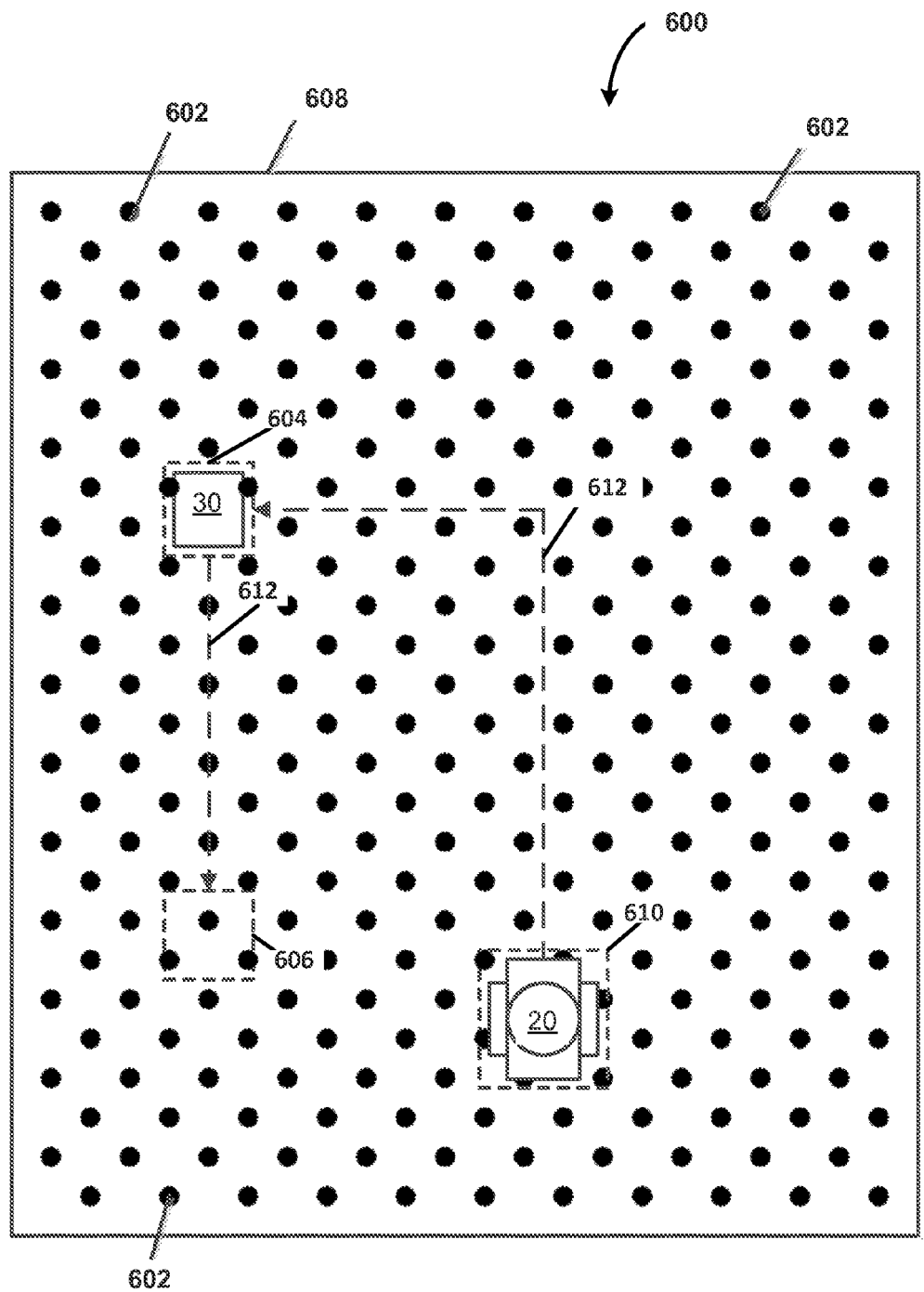
FIG. 10 illustrates an example inventory facility that includes a pattern of fiducial markers used by an unmanned drive unit to navigate about the facility.

FIG. 10 schematically illustrates an example inventory facility 600 that includes fiducial markers 602 distributed in a pattern over the floor of the inventory facility 600. In many embodiments, the fiducial markers 602 encode a small set of values such that the pattern of the fiducial markers 602 includes repeated instances of identically valued fiducial markers. An unmanned mobile drive unit 20 captures images of the fiducial markers 602 as the mobile drive unit 20 moves within the inventory facility 600. For example, the position sensor 140 of the mobile drive unit 20 can include an image capture device, such as a digital camera. In many embodiments, the pattern of fiducial markers is configured such that a plurality of the fiducial markers can be imaged by a mobile drive unit 20 for all locations of the mobile drive unit 20 within an area of interest of the inventory facility 600. The captured image is processed to determine the location of the mobile drive unit 20 within the inventory facility 600. By capturing an image of a plurality of the fiducial markers 602, the relative locations between the imaged fiducial markers can be used in combination with the identities of the imaged fiducial markers in the processing used to determine the location of the mobile drive unit 20 within the inventory facility 600. The determined location is then used in planning and controlling movement of the mobile drive unit 20, including moving to an inventory holder 30 disposed at a first location 604 and moving the inventory holder to a desired second location 606.

Mobile drive unit 20 navigates within a workspace area 608 of the inventory facility 600 using the fiducial markers 602. As illustrated, the mobile drive unit 20 initially resides a location 610 within the workspace 608. Thereafter, the mobile drive unit 20 receives a request to move a portable inventory holder 30 from the first location 604 to the second location 606. In response to receiving this request, the mobile drive unit 20 may either reference a map of the workspace 608 stored within the mobile drive unit 20, may request (or simply receive) the map from a remote entity such as the management module 15, or may request (or simply receive) an indication of one or more subsets of the fiducial markers 602 that apply to the first and second locations and/or an indication of one or more subsets of the fiducial markers 602 applicable to a path to reach these locations.

After referencing the map or otherwise determining the fiducial markers 602 corresponding to a path to the first location 604 and from the first location 604 to the second location 606, the mobile drive unit 20 and/or the management module 15 may determine a path 612 for the mobile drive unit 20 to move along. Thereafter, the mobile drive unit 20 may use its drive mechanism to begin travelling along the path 612. While moving along the path 612, the mobile drive unit 20 may periodically, continuously, or randomly capture images using its camera directed downwards towards the floor and the fiducial markers 602. The mobile drive unit 20 and/or the management module 15 may compare the fiducial markers 602 imaged by the mobile drive unit 20 with the subsets of the fiducial markers 602 determined from the map and corresponding to the path 612 to determine whether the mobile drive unit 20 is in fact on the path 612. If not, then the mobile drive unit 20 may correct its path.

The mobile drive unit 20 may utilize image recognition and comparison techniques to determine whether the images captured by the camera correspond to images of the fiducial markers 602 as expected as determined via the map. While the mobile drive unit 20 can perform the image comparison, in other embodiments the mobile drive unit 20 may provide the images captured by its camera to a remote entity (e.g., management module 15) for performing the comparison. In either case, after reaching the first location 604, the mobile drive unit 20 may lift the portable inventory holder 30 and move the holder 30 to the second location 606.

Furthermore, in some instances the mobile drive unit 20 may utilize the fiducial markers 602 along with additional location-determination techniques. For example, the mobile drive unit 20 may be equipped with global positioning satellite (GPS) technology, which may be used to determine a location of the mobile drive unit 20 according to a first tolerance. The images captured by the camera of the mobile drive unit 20 may then be used to determine the location at a second, lesser tolerance. Stated otherwise, the GPS or other global positioning location technique (e.g., WiFi triangulation, etc.) may be used to locate the mobile drive unit 20 within a particular area of the workspace 608, and the map of the fiducial markers on the floor surface may aid in the determination of the location of the mobile drive unit 20 at a greater level of detail.

Figure 11:
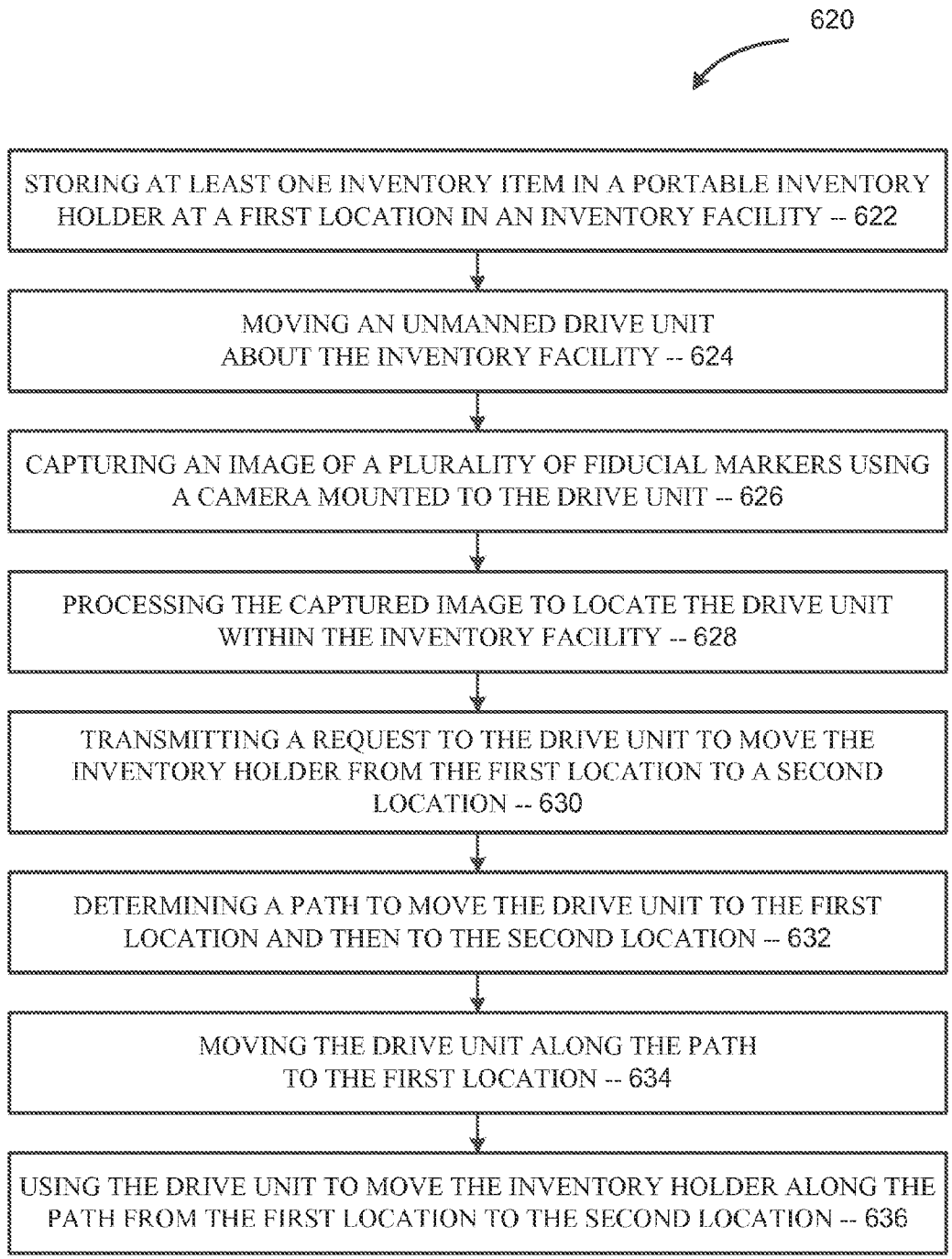
FIG. 11 illustrates acts of an example method for moving an inventory item within the inventory facility of FIG. 10.

FIG. 11 illustrates acts of a method 620 for moving an inventory item, in accordance with many embodiments. Some or all of the method 620 (or any other method described herein, or variations and/or combinations thereof) may be performed under the control of one or more computer systems configured with executable instructions and may be implemented as code (e.g., executable instructions, one or more computer programs and/or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Any suitable inventory system described herein can be used to practice the method 620.

The method 620 includes storing at least one inventory items in a portable inventory holder at a first location in an inventory facility (act 622). An unmanned drive unit is moved about the inventory facility (act 624). The unmanned drive unit captures an image of a plurality of the fiducial markers using a camera (or other suitable device) mounted to the drive unit (act 626). The captured image is processed to locate the drive unit within the inventory facility (act 628). A request is transmitted to the drive unit to move the inventory holder from the first location to the second location (act 630). A path is determined to move the drive unit to the first location and then to the second location (act 632). The drive unit is moved along the path to the first location (act 634). The drive unit is used to move the inventory holder along the path from the first location to the second location (act 636).

Figure 12:
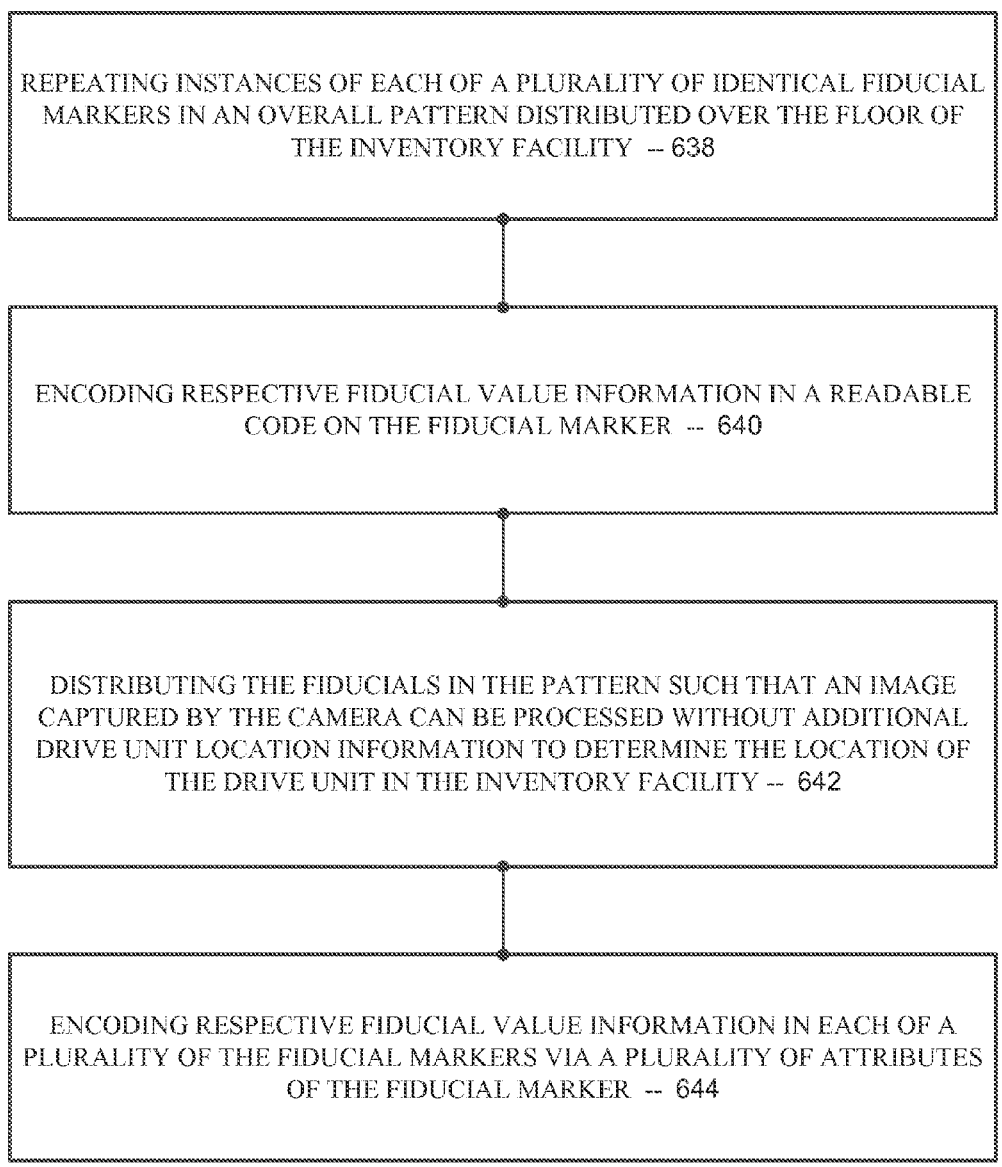
FIG. 12 illustrates additional acts that can be accomplished in the method of FIG. 11.

FIG. 12 illustrates additional acts that can be accomplished in conjunction with the method 620. For example, instances of each of a plurality of identical fiducial markers can be repeated in an overall pattern distributed over the floor of the inventory facility (act 638). To compensate for the lack of unique encoded identification, the relative location between the imaged fiducial markers in combination with the identifies of the imaged fiducials can be used in conjunction with a suitable pattern matching algorithm and the map of locations of the fiducial markers to determine the location of the mobile drive unit 20 within the inventory facility. As another example, the respective fiducial value information can be encoded in a readable code (e.g., bar code or any other suitable readable code, such as QR code, MaxiCode, Data Matrix, EZ Code, or any other identifying tag or code.) on the fiducial marker (act 640). The fiducial markers can be distributed in the pattern such that the images captured by the camera can be processed without additional drive unit location and/or orientation information to determine the location of the mobile drive unit 20 within the inventory facility (act 642). For example, the locational density and variation of the fiducial markers in the pattern can be configured such that the relative positions between and identifications of the fiducial markers in any image, in combination with the location map, provide sufficient information to determine a unique location of the mobile drive unit 20. And in many embodiments, respective fiducial value information is encoded in each of a plurality of the fiducial markers via a plurality of attributes of the fiducial marker (act 644).

FIG. 13 illustrates example attributes by which fiducial value information can be encoded into a fiducial marker. In many embodiments, fiducial value information is encoded using attributes other than or in addition to code. For example, fiducial orientation in combination with the unmanned drive units being configured to determine their own orientation (e.g., via the unmanned drive units including a compass) can be used to encode information. For example, two different possible orientations of the fiducial markers provide for the encoding of one bit of information. Different colors can also be used to encode information. For example, four different colors of fiducial markers can be used to encode two bits of information. Different marker sizes can also be used to encode information. For example, two different sizes of fiducial markers can be used to encode one bit of information. Different shapes can also be used to encode information. For example, two different shapes of fiducial markers (e.g., square and triangular) can be used to encode one bit of information. Accordingly, using the foregoing example attributes provides for the encoding of five bits of information, which can be used to encode 32 values. Additional values can be encoded in a suitable readable code included in each of the fiducial markers, for example, in a bar code. The number of values that can be encoded can be increased further by using a larger variation in the examples of each attribute. Additionally, more than one color can be used on the same fiducial marker. While many embodiments of the fiducial markers do include a suitable readable code (e.g., a bar code), encoding a sufficient number of values via attributes of the fiducial marker may be sufficient to enable not including a readable code on the fiducial markers.

The use of fiducial markers with a small set of values may provide a number of significant benefits. For example, the use of such fiducial markers may result in increased flexibility as to how the markers are distributed in view of the ability to use repeated instances of fiducial markers having the same encoded value and/or attributes. The reduced number of unique fiducial markers may reduce the cost of producing the fiducial markers due to reduced unit cost that may result from the ability to produce multiple identical fiducial markers. By using attributes such as orientation, size, color, and shape to encode information, the resulting fiducial markers may be easier to read than markers that encode only via a readable code (e.g., bar code). When such fiducial markers also encode information via a readable code, the code may be made larger (and therefore possibly easier to read) due to the reduced value information required to be encoded in the readable code. Such fiducial markers may also be easier to install as they do not have to be installed in a uniform grid. Such fiducial markers can be placed on a roll of material as part of the manufacturing process for the fiducial markers. A device can be used to place such fiducial markers as opposed to using highly qualified field technicians to place the fiducial markers. Such fiducial markers may also be more robust to loss of the fiducial markers. Since a large number of visible fiducial markers can be used to provide redundant information to uniquely identify locations, the system can continue to function properly after some of the fiducial markers are lost, thereby reducing maintenance costs and associated down time. To further reduce maintenance costs and associated down time, additional fiducial markers can be placed in high traffic areas to further increase redundancy. By using a pattern of fiducial markers with an increased density of markers, the markers can be more easily located so as to not be placed in areas frequently contacted by the wheels of the mobile drive units 20. Accordingly, by avoiding contact between the wheels of the mobile drive units 20 and the fiducial markers, wear induced damage to the fiducial markers can be reduced, thereby further reducing maintenance costs and associated down time.

After the fiducial markers are placed within the inventory facility, a map can be created that associates each of the fiducial markers with its respective location within the workspace 608. The mobile drive unit 20 can image one or more of the fiducial markers and the image processed to determine the location of the mobile drive unit 20 relative to the imaged fiducial markers. The map can then be used in conjunction with the determined location of the mobile drive unit 20 relative to the imaged fiducial markers to determine the location of the mobile drive unit 20 within the inventory facility. The location of the mobile drive unit 20 can be updated in any suitable fashion as the mobile drive unit 20 moves around the inventory facility. The location of the mobile drive unit 20 can be used to determine a path to move the mobile drive unit 20 to the location of a portable inventory holder 30 and along which the mobile drive unit 20 can move the portable inventory holder to a desired location, such as to a selected inventory station 50.

The map that associates each of the fiducial markers with its respective location within the workspace 608 can be created in a number of ways. For example, a person can use a camera to capture or otherwise create a plan view image of the workspace 608. The plan view image can be processed using software to correlate each of the fiducial markers with a respective location within the workspace 608. As another example, one or more of the mobile drive units 20 can navigate about the workspace 608 while capturing images of the fiducial markers and noting the location at which the images have been captured. The mobile drive units 20 can then either create the map by correlating the different fiducial markers with corresponding locations within the workspace 608, or can provide the captured images and location information to a remote entity (e.g., management module 15) for creation of the map by the remote entity. The mobile drive unit(s) 20 can communicate with the remote entity using any suitable communication means, such as over a wired and/or wireless network(s). In some instances; the remote entity may be located within the inventory facility, while in other instances the remote entity may be located outside of the facility.

Figure 14:
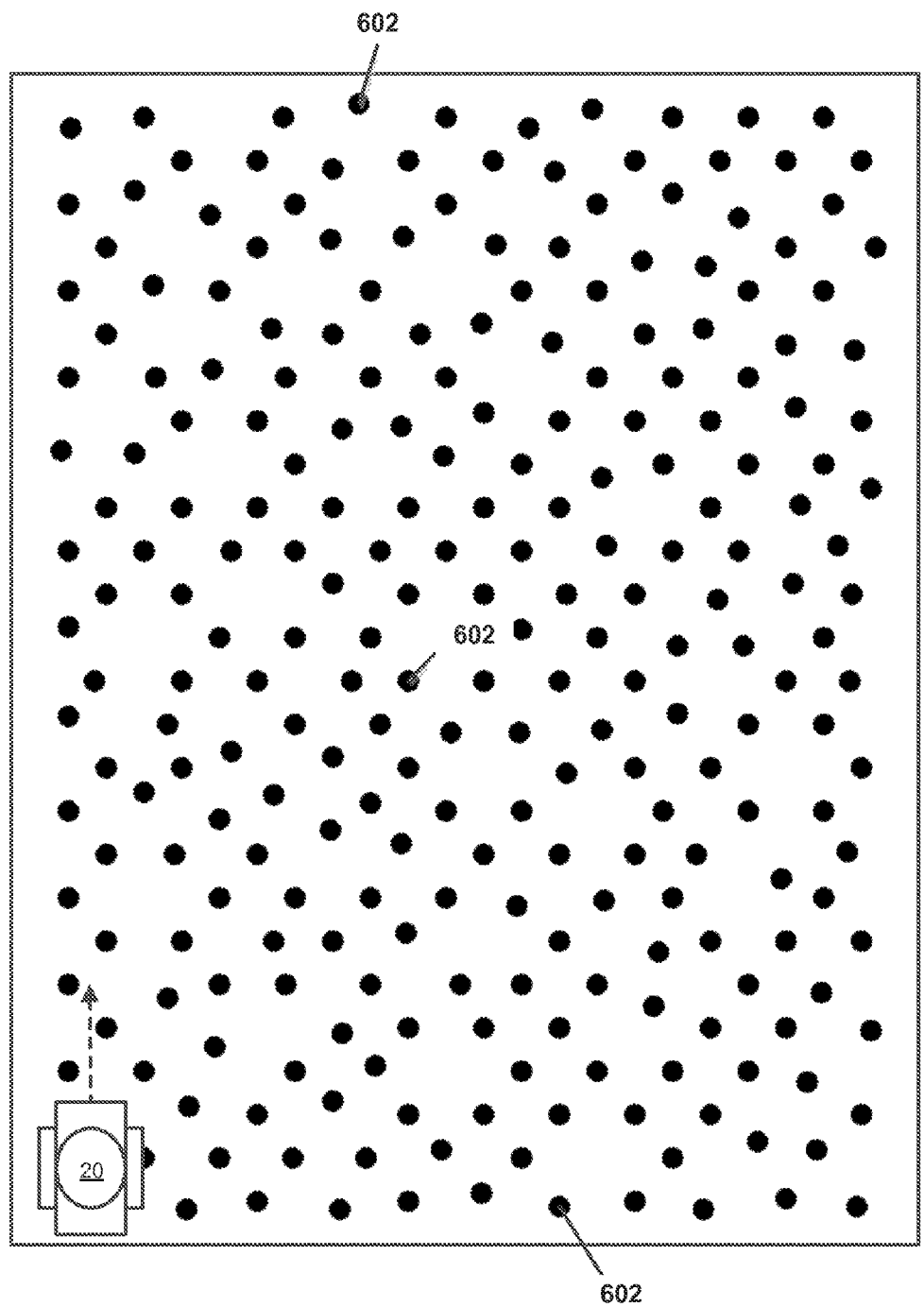
FIG. 14 illustrates an example of an unmanned drive unit navigating about the facility of FIG. 10 to capture images of the fiducial markers and either creating a map of the facility that includes the locations of the fiducial markers or uploading the images to a remote entity to create the map.

FIG. 14 illustrates such an example. Here, an unmanned mobile drive unit 20 navigates about the facility of FIG. 10 to capture images of the fiducial markers 602. In some instances, multiple drive units 20 can capture images, either by traveling in pre-specified paths or random paths. Utilizing multiple mobile drive units 20 to capture images for creating the map may result in a level of redundancy that increases the accuracy of the resulting map.

Figure 15:
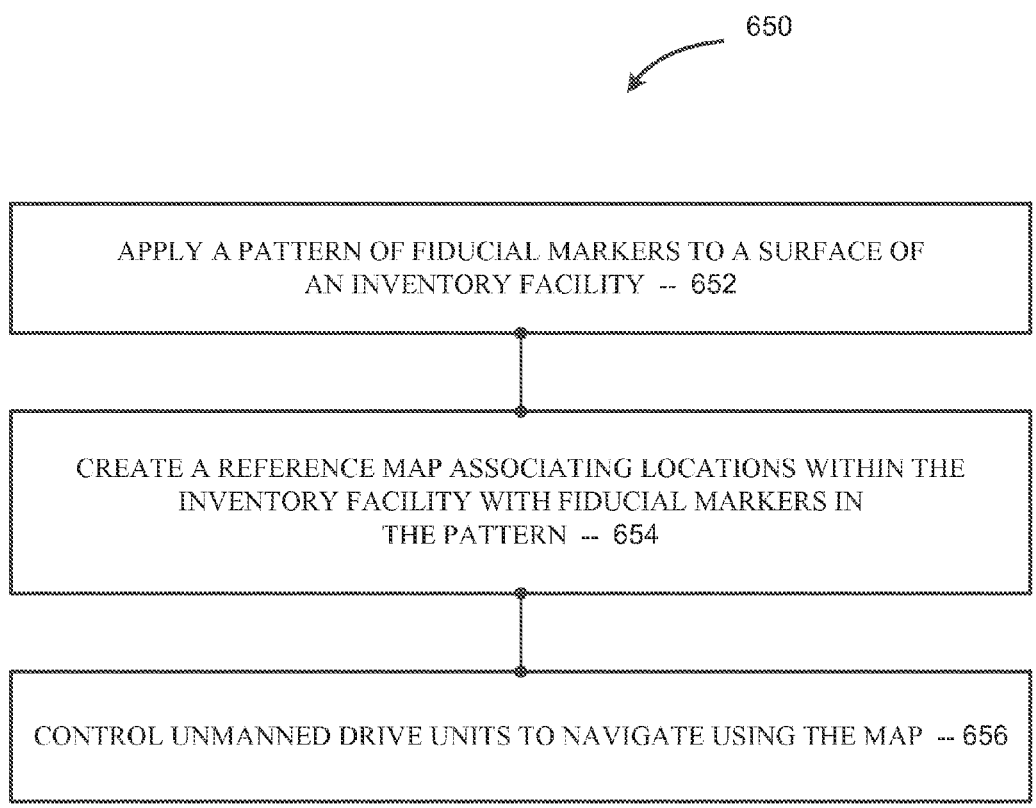
FIG. 15 illustrates an example method for creating a map to use when controlling an unmanned drive unit to navigate about the facility of FIG. 10, and using the map when doing so.

FIG. 15 illustrates acts of an example method 650 for controlling an unmanned mobile drive unit to navigate within an inventory facility. Some or all of the method 650 (or any other method described herein, or variations and/or combinations thereof) may be performed under the control of one or more computer systems configured with executable instructions and may be implemented as code (e.g., executable instructions, one or more computer programs and/or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Any suitable inventory system described herein can be used to practice the method 650.

The method 650 includes applying a pattern of fiducial markers to a surface of the inventory facility (act 652). For example, a mobile drive unit 20 and/or a person(s) can apply the fiducial markers to a floor surface of the inventory facility. Furthermore, while this example describes applying the fiducial markers to the floor, in other instances the fiducial markers may be applied to the ceiling and/or wall of the inventory facility. A reference map is created that associates locations within the inventory facility with the fiducial markers in the pattern (act 654). The reference map is then used to control navigation of the mobile drive units 20 within the inventory facility (act 656). For instance, a mobile drive unit 20 can be instructed to move a portable inventory holder from a first location to a second location. The location of the mobile drive unit 20 can be determined by processing an image of a subset of the fiducial markers captured by the mobile drive unit 20. The determined location of the mobile drive unit 20 can then be used, and suitably updated, to move the mobile drive unit 20 to the first location so as to then move the portable inventory holder from the first location to the second location.

Figure 16:
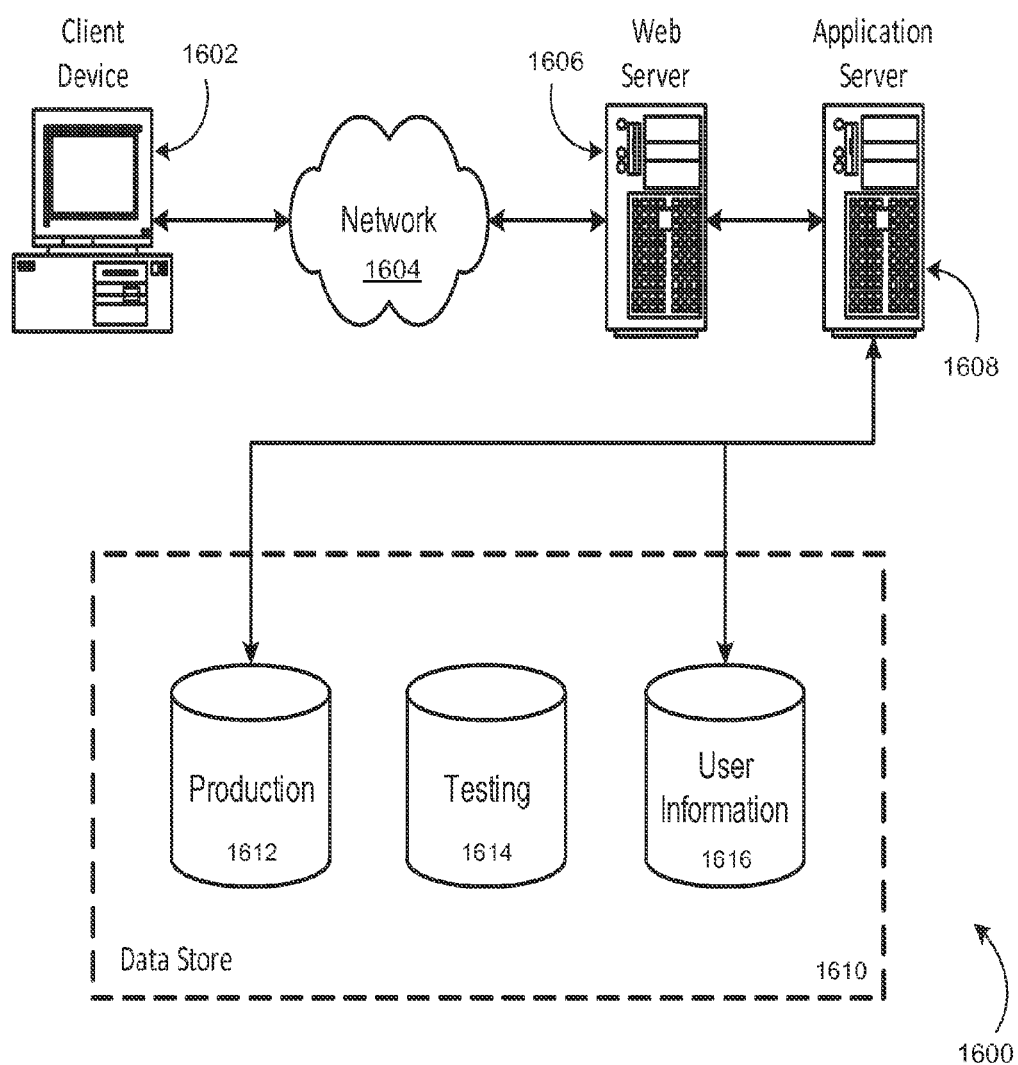
FIG. 16 illustrates aspects of an example environment for implementing aspects in accordance with various embodiments.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system for managing inventory items, comprising:
    a plurality of fiducial markers distributed in a pattern on a floor of an inventory facility, each of the plurality of fiducial markers encoding respective fiducial value information using a readable code and at least one attribute of the fiducial marker, the at least one attribute including at least one of: (a) an orientation of the fiducial marker relative to a reference direction, (b) a color of the fiducial marker, (c) a size of the fiducial marker, or (d) a shape of the fiducial marker; and
    a drive unit including an image capture device configured such that a respective subset of the plurality of the fiducial markers can be imaged by the image capture device for each of a plurality of respective locations of the drive unit on the floor, the drive unit being configured to: (a) capture at least one image of a subset of the plurality of the fiducial markers, (b) determine or receive a location of the drive unit, the location being based on processing of the at least one captured image, and (c) move the drive unit based at least in part on the at least one captured image.

2. The system of claim 1, wherein the pattern of fiducial markers includes repeated instances of each of a plurality of uniquely identifiable fiducial markers.

3. The system of claim 2, wherein the pattern of fiducial markers includes 100 or fewer uniquely identifiable fiducial markers.

4. The system of claim 1, wherein the subset of the plurality of the fiducial markers captured in the at least one image includes at least two of the plurality of the fiducial markers.

5. The system of claim 1, wherein the readable code includes at least one of: (a) bar code, (b) QR code, (c) MaxiCode, (d) Data Matrix, or (e) EZ Code.

6. The system of claim 1, wherein the at least one attribute includes at least two of: (a) the orientation of the fiducial marker relative to the reference direction, (b) the color of the fiducial marker, (c) the size of the fiducial marker, or (d) the shape of the fiducial marker.

7. The system of claim 1, wherein the pattern is a random pattern distributed on the floor of the inventory facility including repeated instances of each of a plurality of uniquely identifiable fiducial markers.

8. The system of claim 1, wherein the drive unit is further configured to determine or receive control operations for the drive unit based at least in part on the at least one captured image, the control operations for the drive unit including at least one of stopping the drive unit, rotating the drive unit, redirecting the drive unit, or changing operations of the drive unit.

9. A method for managing inventory items, the method comprising:
    instructing an unmanned drive unit to move about an inventory facility having a floor;
    capturing at least one image of a subset of a plurality of fiducial markers, distributed in a pattern on the floor, using an image capture device mounted to the drive unit, each of the plurality of fiducial markers encoding respective fiducial value information using a readable code and at least one attribute of the fiducial marker, the at least one attribute including at least one of: (a) an orientation of the fiducial marker relative to a reference direction, (b) a color of the fiducial marker, (c) a size of the fiducial marker, or (d) a shape of the fiducial marker;
    processing the at least one captured image to locate the drive unit within the inventory facility; and
    instructing the drive unit to move in the inventory facility based at least in part on the at least one captured image.

10. The method of claim 9, wherein the pattern of fiducial markers includes repeated instances of one or more uniquely identifiable fiducial markers.

11. The method of claim 9, further comprising distributing the fiducial markers in the pattern such that the at least one image captured by the image capture device can be processed without additional drive unit location information to determine a location of the drive unit in the inventory facility, wherein the subset of the plurality of fiducial markers captured in the at least one image includes at least two of the plurality of fiducial markers.

12. The method of claim 9, wherein the readable code includes at least one of: (a) bar code, (b) QR code, (c) MaxiCode, (d) Data Matrix, or (e) EZ Code.

13. The method of claim 9, further comprising controlling operations of the drive unit based at least in part on the at least one captured image, wherein the operations include at least one of stopping the drive unit, rotating the drive unit, redirecting the drive unit, or changing operations of the drive unit.

14. A system for managing inventory items, comprising:
a plurality of fiducial markers distributed in a pattern on a floor of an inventory facility, each of the plurality of fiducial markers encoding respective fiducial value information using a readable code, the pattern of fiducial markers including repeated instances of one or more uniquely identifiable fiducial markers; and
a drive unit including an image capture device configured such that a respective subset of the plurality of the fiducial markers can be imaged by the image capture device for each of a plurality of respective locations of the drive unit on the floor, the drive unit being configured to: (a) capture at least one image of a subset of the plurality of the fiducial markers, (b) determine or receive a location of the drive unit, the location being based on processing of the at least one captured image, and (c) move the drive unit based at least in part on the at least one captured image.

15. The system of claim 14, wherein the pattern of fiducial markers includes repeated instances of each of a plurality of uniquely identifiable fiducial markers.

16. The system of claim 15, wherein the pattern of fiducial markers includes 100 or fewer uniquely identifiable fiducial markers.

17. The system of claim 14, wherein the subset of the plurality of the fiducial markers captured in the at least one image includes at least two of the plurality of the fiducial markers.

18. The system of claim 14, wherein the readable code includes at least one of: (a) bar code, (b) QR code, (c) MaxiCode, (d) Data Matrix, or (e) EZ Code.

19. The system of claim 14, wherein the pattern is a random pattern distributed on the floor of the inventory facility including the repeated instances of the one or more uniquely identifiable fiducial markers.

20. The system of claim 14, wherein the drive unit is further configured to determine or receive control operations for the drive unit based at least in part on the at least one captured image, the control operations for the drive unit including at least one of stopping the drive unit, rotating the drive unit, redirecting the drive unit, or changing operations of the drive unit.

\* \* \* \* \*